United States Patent
Lessman et al.

(10) Patent No.: US 7,143,540 B2
(45) Date of Patent: Dec. 5, 2006

(54) FISH HANDLING SYSTEM FOR BIG GAME TUBE FISHING

(76) Inventors: William Eugene Lessman, 140 Snowshoe Rd., Acme, PA (US) 15610; Gregory Wayne Lessman, 647 Tram Rd., Mt. Pleasant, PA (US) 15666

( * ) Notice: Subject to any disclaimer, the term of this patent is extended or adjusted under 35 U.S.C. 154(b) by 20 days.

(21) Appl. No.: 11/123,711

(22) Filed: May 7, 2005

(65) Prior Publication Data

US 2005/0284012 A1    Dec. 29, 2005

Related U.S. Application Data (60) Provisional application No. 60/582,921, filed on Jun. 28, 2004.

(51) Int. Cl.
*A01K 77/00* (2006.01)
*A01K 97/00* (2006.01)

(52) U.S. Cl. .............................. 43/11; 43/4; 43/7; 43/12

(58) Field of Classification Search .................. 43/7, 43/8, 11, 12, 4, 54.1; 33/511, 494, 549, 551; 114/61.1, 255; 441/44, 45, 46
See application file for complete search history.

(56) References Cited

U.S. PATENT DOCUMENTS

| | | | | |
|---|---|---|---|---|
| 76,387 A * | 4/1868 | Bell | ............................ | 43/8 |
| 461,106 A * | 10/1891 | Oberly | ........................ | 33/494 |
| 1,138,541 A * | 5/1915 | Conekin | ........................ | 43/8 |
| 1,138,542 A * | 5/1915 | Conekin | ........................ | 43/8 |
| 1,332,653 A * | 3/1920 | Wakefield | ........................ | 43/4 |
| 1,474,804 A * | 11/1923 | Tyrrell | ........................ | 33/511 |
| 2,121,052 A * | 6/1938 | Dudley et al. | ................... | 43/7 |
| 2,129,469 A * | 9/1938 | Hedges | ........................ | 43/11 |
| 2,141,799 A * | 12/1938 | Pyle | ............................ | 441/46 |
| 2,549,475 A * | 4/1951 | Jardim | ........................ | 43/11 |
| 2,557,078 A * | 6/1951 | Cutri | ........................ | 43/7 |
| 2,597,288 A * | 5/1952 | Caldwell | ...................... | 441/45 |
| 2,600,773 A * | 6/1952 | Hungerford | .................... | 43/12 |
| 2,816,750 A * | 12/1957 | Martin | ........................ | 43/4 |
| 3,090,339 A * | 5/1963 | Carr | ........................ | 114/61.1 |
| 3,099,888 A * | 8/1963 | Jaster | ........................ | 43/11 |
| 3,179,960 A * | 4/1965 | Nimmo | ........................ | 441/44 |
| 3,223,189 A * | 12/1965 | Robbins | ........................ | 43/11 |
| 3,259,988 A * | 7/1966 | Lunn | ........................ | 33/511 |
| 3,276,527 A * | 10/1966 | Nelson | ........................ | 43/11 |
| 3,473,502 A * | 10/1969 | Wittkamp | .................... | 441/45 |
| 3,579,680 A * | 5/1971 | McLean | ...................... | 441/45 |
| 3,678,611 A * | 7/1972 | Files | ........................ | 43/54.1 |
| 3,758,897 A * | 9/1973 | Shaw | ........................ | 441/45 |
| 3,803,742 A * | 4/1974 | Foster | ........................ | 43/11 |
| 3,804,177 A * | 4/1974 | Renfroe | ........................ | 114/61.1 |
| 3,812,805 A * | 5/1974 | Forssell et al. | ................ | 441/45 |

(Continued)

FOREIGN PATENT DOCUMENTS

CA    2340082 A1 *  8/2002

(Continued)

*Primary Examiner*—Darren W. Ark (57) ABSTRACT

A Fish Handling System For Big Game Tube Fishing is a single unit comprised of both a landing net and raised tabletop/inch incremented measuring board supported by a platform mounted atop two pontoons. Landing net access is obtained by lifting the hinged table/measuring board. The fish handling system has an adjustable multipurpose handle, when drawn taut it acts as the handle, when loosened it is used to attach the fish handling system to the float tube's D-rings using quick release clamps of preference. Thus providing a stable workstation and hands free landing net within comfortable reach of the float tube fisherman.

4 Claims, 8 Drawing Sheets

U.S. PATENT DOCUMENTS

| | | | | |
|---|---|---|---|---|
| 3,877,144 A * | 4/1975 | LeBlanc | | 43/54.1 |
| 3,922,812 A * | 12/1975 | Steele | | 43/100 |
| 4,031,650 A * | 6/1977 | Popeil | | 43/12 |
| 4,095,301 A * | 6/1978 | Guillen | | 114/255 |
| 4,458,621 A * | 7/1984 | De Clifford | | 114/255 |
| 4,487,588 A * | 12/1984 | Lewis et al. | | 441/45 |
| 4,631,851 A * | 12/1986 | Whitehurst | | 43/7 |
| 4,638,593 A * | 1/1987 | Garcia | | 43/54.1 |
| 4,753,031 A * | 6/1988 | Owen | | 43/54.1 |
| 4,839,675 A * | 6/1989 | Owen | | 43/4 |
| 5,097,617 A * | 3/1992 | Craven | | 43/4 |
| 5,100,198 A * | 3/1992 | Baltzell | | 43/54.1 |
| 5,117,577 A * | 6/1992 | Burghoff | | 43/44.99 |
| 5,148,607 A * | 9/1992 | Lasiter | | 43/4 |
| 5,163,694 A * | 11/1992 | Reichek | | 43/54.1 |
| 5,226,184 A * | 7/1993 | Cheng | | 441/45 |
| 5,276,989 A * | 1/1994 | Lumb et al. | | 43/11 |
| 5,339,532 A * | 8/1994 | O'Keefe | | 43/4 |
| 5,402,596 A * | 4/1995 | Gillming, Jr. | | 43/54.1 |
| 5,419,074 A * | 5/1995 | Thomas | | 43/11 |
| 5,501,026 A * | 3/1996 | Bryant et al. | | 43/12 |
| 5,526,575 A * | 6/1996 | Hoover et al. | | 43/4 |
| 5,551,186 A * | 9/1996 | Harada | | 43/55 |
| 5,605,003 A * | 2/1997 | Krc et al. | | 43/12 |
| 5,637,838 A * | 6/1997 | Arey et al. | | 33/511 |
| 6,003,329 A * | 12/1999 | Stanton, Jr. | | 43/54.1 |
| 6,014,833 A * | 1/2000 | Benavidez | | 43/54.1 |
| 6,058,642 A * | 5/2000 | Branneman | | 43/12 |
| 6,094,996 A * | 8/2000 | Campbell et al. | | 43/7 |
| 6,115,932 A * | 9/2000 | Fedora | | 33/511 |
| 6,132,604 A * | 10/2000 | Kirchoff | | 43/11 |
| 6,405,478 B1 * | 6/2002 | Westley | | 43/54.1 |
| 6,415,521 B1 * | 7/2002 | Schnell | | 33/511 |
| 6,446,378 B1 * | 9/2002 | Welch et al. | | 43/11 |
| 6,546,664 B1 * | 4/2003 | Busboom | | 43/12 |
| 6,582,264 B1 * | 6/2003 | Brown | | 114/61.1 |
| 6,594,939 B1 * | 7/2003 | Ondusko | | 43/4 |
| 6,615,532 B1 * | 9/2003 | Abel | | 43/11 |
| 6,765,155 B1 * | 7/2004 | Gray | | 43/4 |
| 6,901,674 B1 * | 6/2005 | Pieczynski | | 33/511 |
| 6,959,499 B1 * | 11/2005 | Bini | | 43/4 |
| 7,055,257 B1 * | 6/2006 | Pieczynski | | 33/511 |
| 2002/0017049 A1 * | 2/2002 | Millet et al. | | 43/11 |
| 2005/0055869 A1 * | 3/2005 | Corso et al. | | 43/54.1 |
| 2005/0198887 A1 * | 9/2005 | Abel | | 43/11 |
| 2005/0223616 A1 * | 10/2005 | Beasley | | 43/4 |

FOREIGN PATENT DOCUMENTS

| | | | |
|---|---|---|---|
| DE | 29700530 U1 * | 2/1997 |
| EP | 522802 A1 * | 1/1993 |
| FR | 2510740 A * | 2/1983 |
| FR | 2575364 A1 * | 1/1985 |
| FR | 2582190 A1 * | 11/1986 |
| FR | 2588446 A2 * | 4/1987 |
| FR | 2700443 A1 * | 7/1994 |
| GB | 1533695 A * | 11/1978 |
| GB | 2396542 A * | 6/2004 |

* cited by examiner

FISH HANDLING SYSTEM FOR BIG GAME TUBE FISHING

CROSS REFERENCES TO RELATED APPLICATIONS

This application claims the benefit of U.S. Provisional Application No. 60/582,921 filed on Jun. 28, 2004, which is hereby incorporated by reference in its entirety.

U.S. PATENT REFERENCES

| | | | |
|---|---|---|---|
| 5,402,596 | July 1993 | Gillming | 43/54 |
| 3,478,463 | November 1969 | Ruter | 43/55 |
| 5,540,169 | July 1996 | Davis et. al. | 43/55 |
| 6,415,521 | July 2002 | Schnell | 33/511 |

STATEMENT REGARDING FEDERALLY SPONSORED REASEARCH (NOT APPLICABLE)

REFERENCE TO SEQUENCE LISTING (NOT APPLICABLE)

BACKGROUND OF THE INVENTION

1. Field of Invention

The present invention relates specifically to sporting goods, fishing accessories and devices for float tube fishermen, and more particularly, to a floating platform especially adapted for landing, holding, and measuring big game fish, (example: bass, northern pike, muskellunge, etc.).

2. Description of the Prior Art

Fishing accessories in the form of floating tables, floating nets, and measuring boards for fishing are known in the prior arts sporting goods. For example, U.S. Pat. No. 5,402,596 discloses a floating table shaped accessory, U.S. Pat. No. 3,478,463 discloses a floating net type of device, U.S. Pat. No. 5,540,169 discloses a pontoon type vessel and U.S. Pat. No. 6,415,521 discloses a fish measuring apparatus. These prior art devices require a float tube fisherman to transport, by means of towing, numerous individual devices, which are awkward to use in a float tube while fishing for big game fish by oneself.

Thus, while the foregoing bodies of prior art indicate it to be well to have float tube fishing accessories, the provision of a more convenient utilization of a more utile and cost effective device combining an elevated tabletop, a measuring board, and a landing net into a single unit is not contemplated. Nor does the prior art described above teach or suggest a floating fish handling system that may be easily used by an individual float tube fisherman for landing, holding, and measuring big game fish.

BREIF SUMMARY OF THE INVENTION

To achieve the foregoing and other advantages, the present invention, briefly described, provides a floating base comprised of two pontoons kept separated and held in place by a straight pontoon support brace and a U-shaped pontoon support brace wherein the landing net is fastened to the top and running the length of the pontoons whereas the tabletop/measuring board is attached to the top surfaces of the pontoon's support braces using hinges. The device is easily attached to the fishing tube by the loosening of the adjustable multi-purpose rope handle and the then slackened rope handle is connected to the fishing tube's D-rings using two quick release fastening devices. To gain access to the landing net the float tube fisherman needs only to lift the hinged table to its full opened position.

The above description set forth the more important features of the present invention in order that the detailed description thereof that follows may be better understood, and in order that the present contributions to the art may be better appreciated. There are, of course, additional features that will be described hereinafter.

In this respect, before explaining the preferred Embodiments of the invention in detail, it is to be understood that the invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important that the claims be regarded as including such equivalent constructions insofar as they do not depart from the spirit and scope of the present invention.

Further, the purpose of the foregoing abstract is to enable the U.S. Patent and Trademark Office and the public generally, and especially scientists, engineers and practitioners in the art who are not familiar with patent or legal terms of phraseology, to determine quickly from a cursory inspection the nature and essence of the technical disclosure of the application, the abstract is neither intended to define the invention or the application, which only is measured by the claims, nor is it intended to be limiting as to the scope of the invention in any way.

It is therefore an object of the present invention to provide a new fish handling system for big game tube fisherman that has all of the advantages of the prior art and none of the disadvantages.

It is another object of the present invention to provide a new fish handling system for big game tube fisherman that may be easily and efficiently manufactured and marketed.

It is a further objective of the present invention to provide a new fish handling system for big game tube fisherman which is susceptible of low cost of manufacture with regard to both materials and labor, and which accordingly is then susceptible of low prices of sale to the consuming public.

An even further object of the present invention is to provide a new fish handling system for big game tube fisherman that is of durable and reliable construction, yet light in weight.

Yet still a further object of the present invention is to provide a new fish handling system for big game tube fisherman which is short, compact and fits easily into a small vehicle.

Still yet a further object of the present invention is to provide a new fish handling system for big game tube fisherman that maintains stable buoyancy when weight is applied.

It is even still a further object of the present invention to provide a new fish handling system for big game tube fisherman that is easy to use by one person.

Still a further object of the present invention is to provide a new fish handling system for big game tube fisherman that has the smallest possible amount of drag when being towed across the water's surface.

It is even yet still a further object of the present invention to provide a new fish handling system for big game tube fisherman that may be carried easily.

Still yet even a further object of the present invention is to provide a new fish handling system for big game tube fisherman which is pleasing to the eye and compliments the appearance of the fisherman's float tube.

An even still further object of the present invention is to provide a new fish handling system for big game tube fisherman that provides a temporary resting place for a tackle box when changing fishing lures.

Yet even a still further object of the present invention is to provide a new fish handling system for big game tube fisherman which may be assembled and disassembled quickly and easily using only one tool (example: screwdriver).

These together with still other objects of the invention, along with the various features of novelty which characterizes the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BREIF DESCRIPTION OF THE SEVERAL VEIWS OF THE DRAWINGS

The invention will be better understood and the above objects as well as objects other than those set forth above will become more apparent after a study of the following detailed description thereof. Such description makes reference to the annexed drawings within.

DETAILED DESCRIPTION OF THE INVENTION

With reference now to the drawings, a new Fish Handling System For Big Game Tube Fishing embodying the principles and concepts of the present invention will be described.

Figure 1:
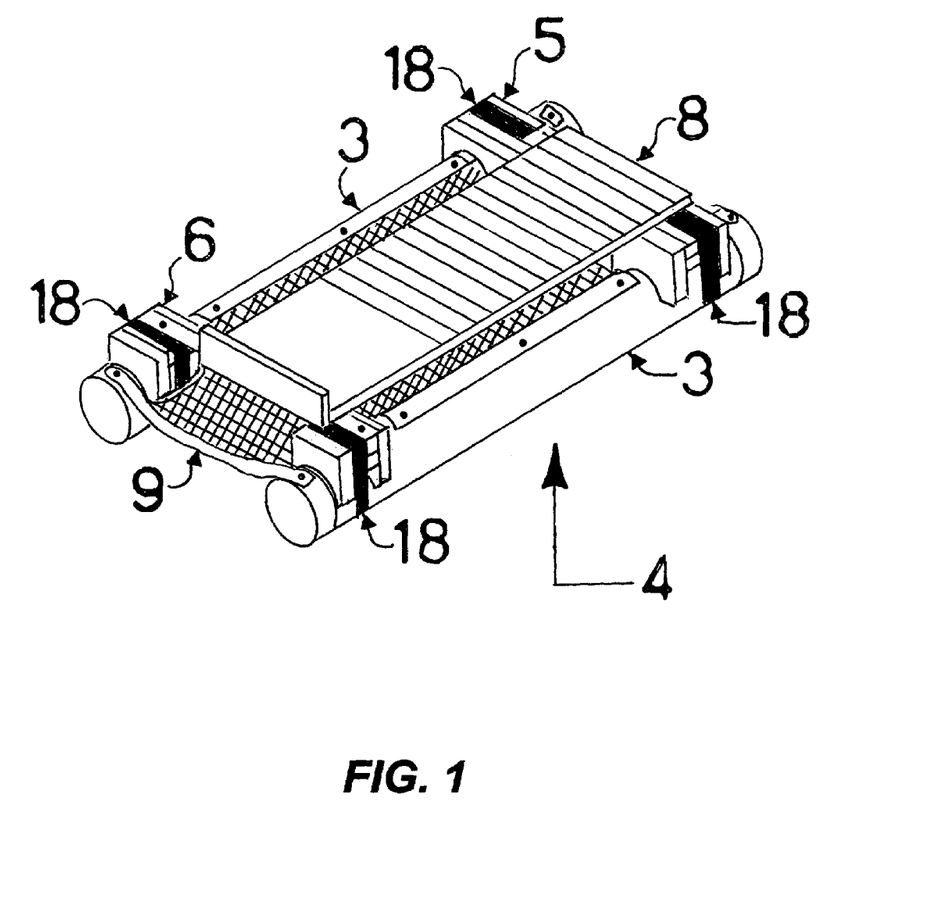
FIG. 1 is a perspective elevation view showing the first two preferred embodiments of the Fish Handling System For Big Game Tube Fishing's of the present invention floating tabletop/measuring board and landing net combination.
Figure 9:
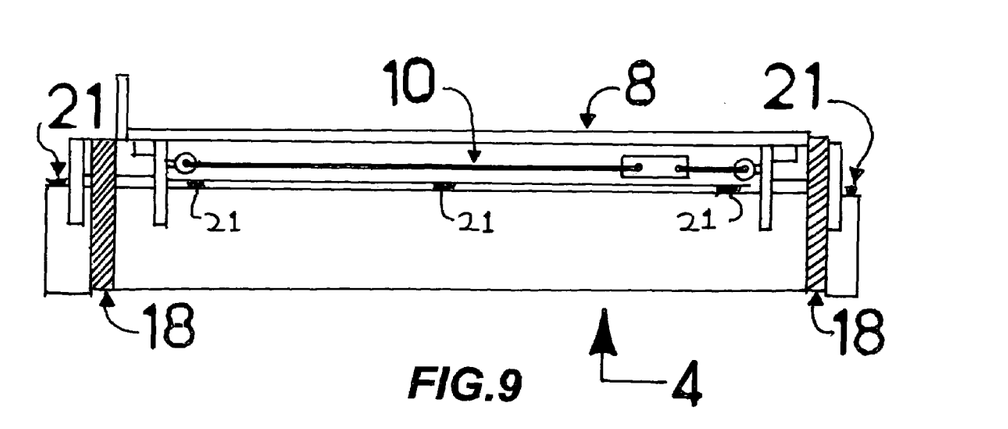
FIG. 9 is a side view of the Fish Handling System For Big Game Tube Fishing showing the embodiments of FIGS. 1–8 in accordance with the present invention.
Figure 11:
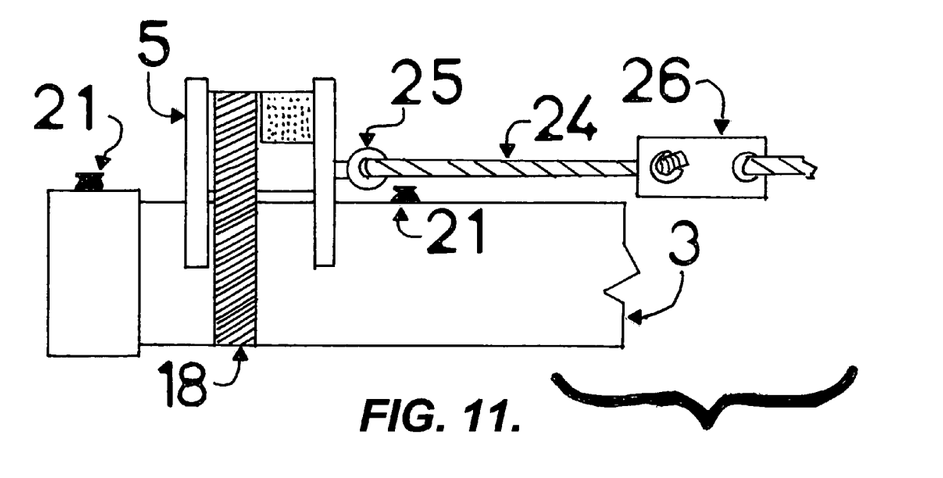
FIG. 11 is a sectional side view from the preferred embodiment of FIG. 9 of the Fish Handling System For Big Game Tube Fishing's adjustable multi-purpose handle's guy line threaded through the eye bolt attachment to the straight-brace's mounting bracket and the sliding guy line stop.
Figure 12:
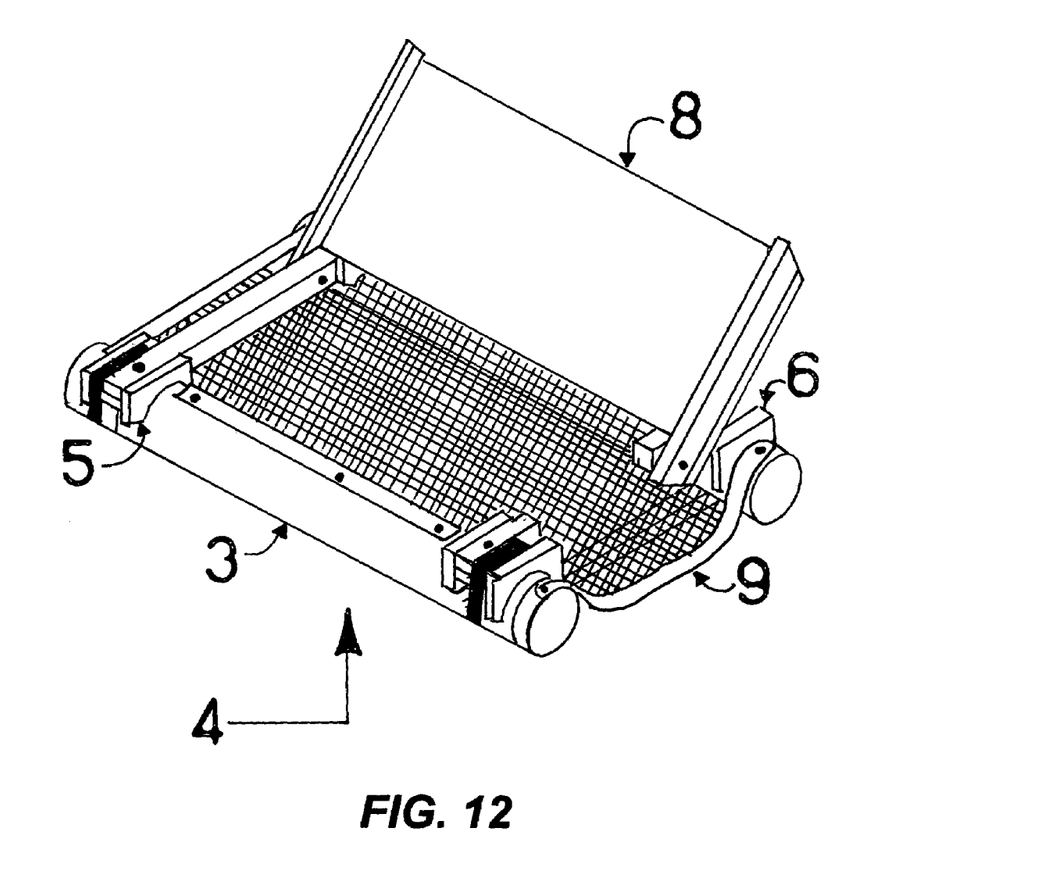
FIG. 12 is an elevated perspective view demonstrating accessing of the embodiments of FIGS. 1, 5, 8, & 9 the landing net.

Turning initially to FIGS. 1, 9, & 12, there are shown the first exemplary embodiments of the Fish Handling System For Big Game Tube Fishing of the invention generally designated by the reference numeral 4. In its preferred form, the Fish Handling System For Big Game Tube Fishing 4 comprises generally of two pontoons 3, a straight pontoon mounting brace 5, a U-brace pontoon mounting brace 6, a movable tabletop/measuring board combination 8, a landing net 9, and an adjustable multi-purpose handle 10, refer to FIGS. 9, 10 & 11.

Figure 2:
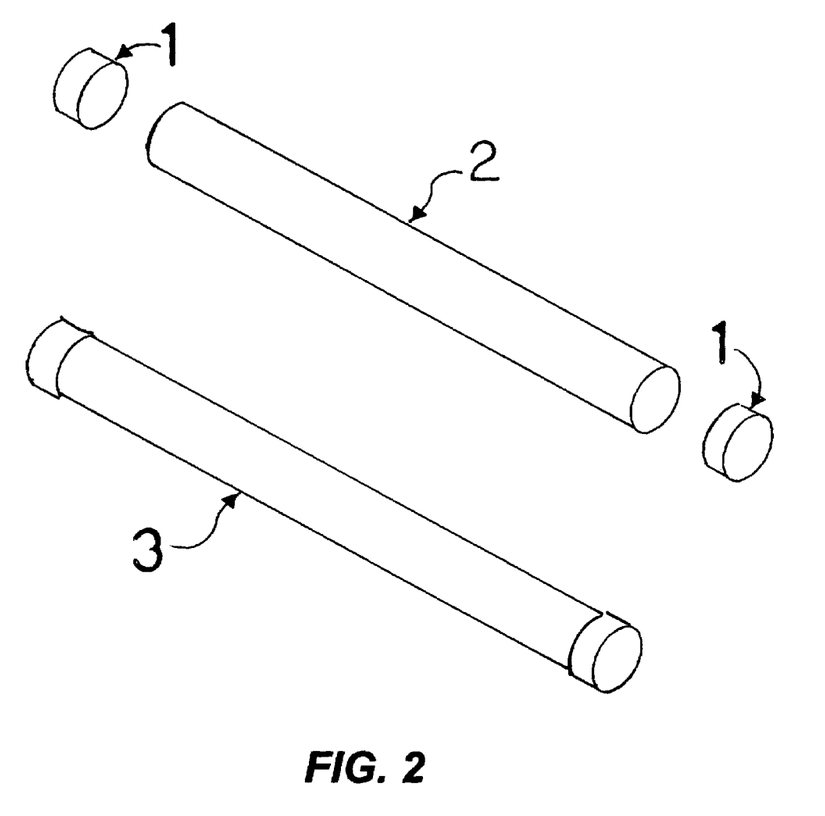
FIG. 2 is a perspective side view of the Fish Handling System For Big Game Tube Fishing's pontoon assemblies.
Figure 3A:
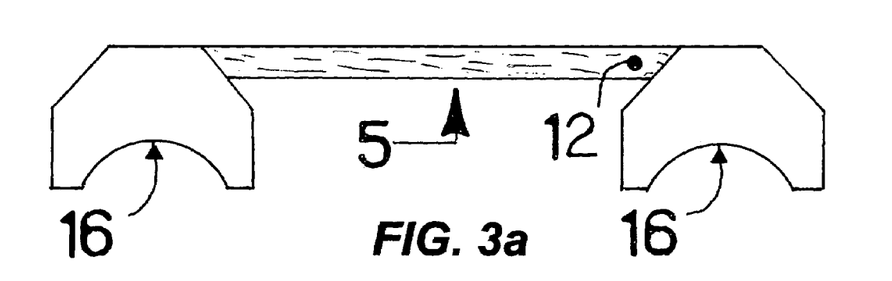
FIG. 3a is a front view of the pontoon's straight-brace mounting assembly.
Figure 3B:
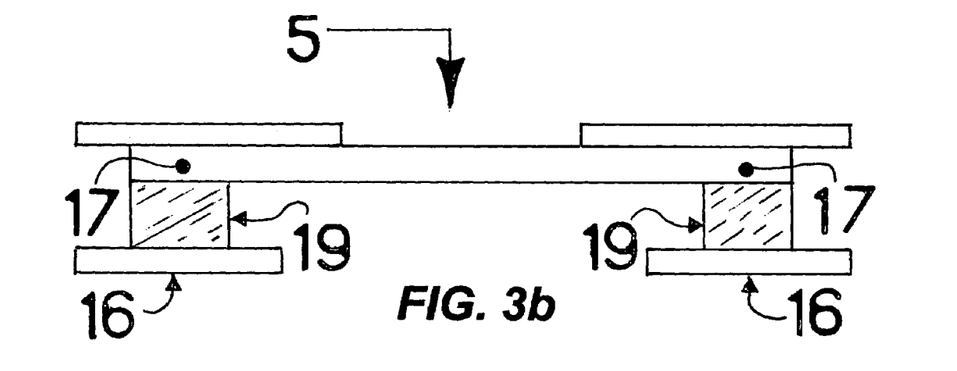
FIG. 3b is an elevation view of the pontoon's straight-brace mounting assembly.
Figure 3C:
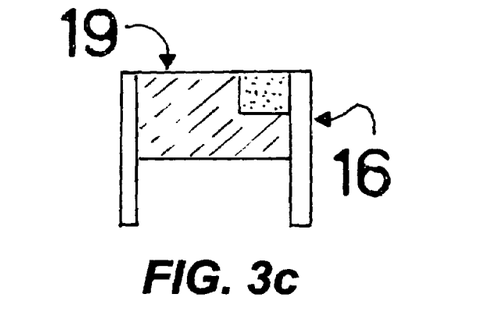
FIG. 3c is a side view of the straight-brace's and U-brace's pontoon mounting bracket assemblies.
Figure 4:
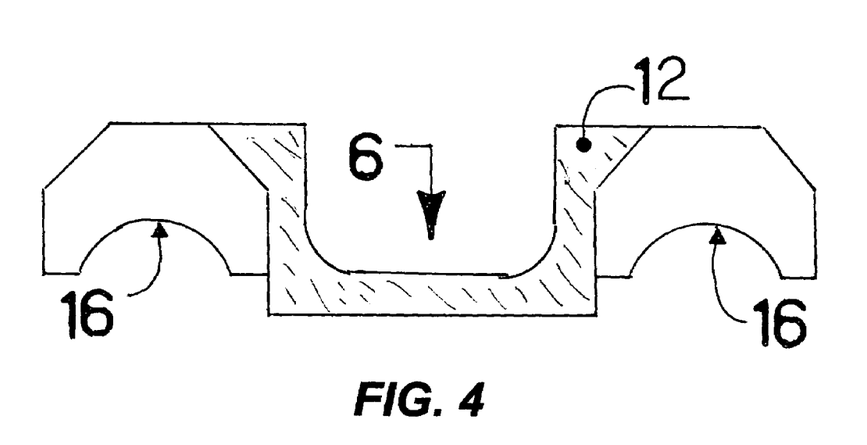
FIG. 4 is a front view of the U-brace assembly.

Referring to FIG. 2, the pontoons 3 uses a cylindrical thin walled PVC body 2 cut to the desired workable length and capped with matching PVC cap 1 with glue as the bonding agent.

Figure 5:
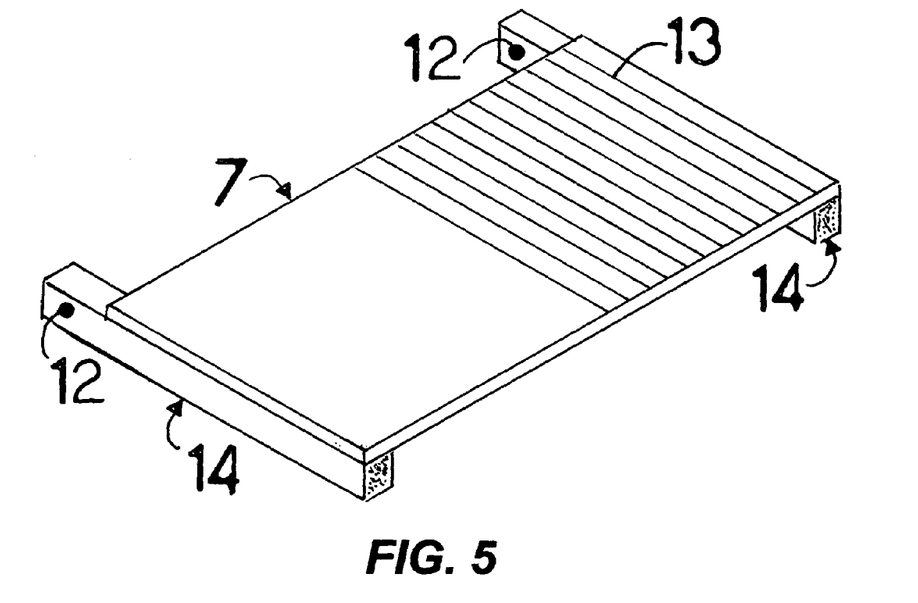
FIG. 5 is an elevated peripheral view of the tabletop/measuring board minus the lip board.
Figure 6:
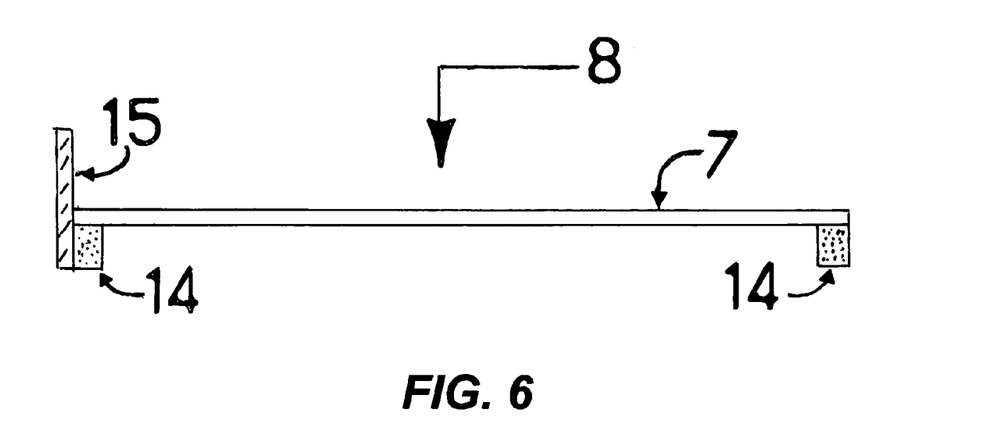
FIG. 6 is a side view of the tabletop/measuring board with the lip board.
Figure 7:
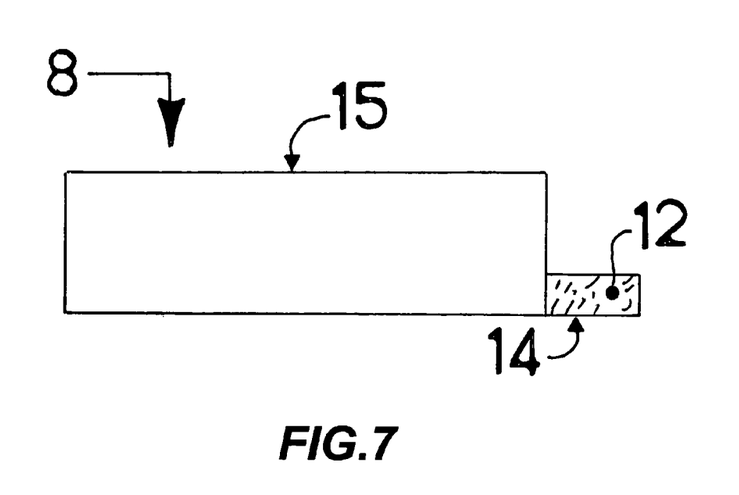
FIG. 7 is a side view of the lip board end of the tabletop/measuring board.

Referring to FIG. 5, the tabletop/measuring board 7, after the marking of the inch increment lines 13 across the width and along the entire length of the topside of the board 7, is attached to the table support arms 14 fitting flush at the ends and with the facing front edge of said table 7. The table-support arms 14 should protrude past the width of the board so that the mounting holes 12 for the hinge may be made. As shown by FIGS. 6 & 7, the lip board 15 is mounted perpendicular to the tabletop 7 at the zero-inch marked end of the tabletop/measuring board making the completed tabletop/measuring board 8 ready for mounting to the pontoon mounting braces 5 & 6.

The pontoon mounting braces 5 & 6, in theory, should be constructed of a lightweight plastic material, however, a person or persons proficient in the arts of carpentry and/or woodworking should have no problem in constructing the said braces 5 & 6 from the details established in FIGS. 3a, 3b, 3c, and 4 in the drawings section of this disclosure.

Now, at this time, the completed tabletop/inch incremented measuring board 8 and the pontoon mounting braces 5 & 6 may be attached by a fastening device placed in and through the mounting holes 12 producing a hinged joint that keeps the two parts connected yet allowing the uninhibited movement of the said tabletop 8. The braces 5 & 6 should be overlapped at their outer edges by said table's 8 table support braces 14 as shown in FIG. 12. The hinged joints can comprise threaded bolts placed through holes 12 in the straight brace 5, U-brace 6, and table support braces 14 and which are held in place using lock washers and hex head nuts.

Arrange said pontoons 3 parallel with each other on a level flat surface. Next, place the completed platform assembly, the combined connected table/measuring board 8, straight brace 5 and the U-brace 6, atop pontoons 3 with the pontoons 3 coming to rest in the concave sections of the mounting bracket 16 of the pontoon mounting braces 5 & 6.

Once this task has been completed it is time to center the tabletop/measuring board 8 with the center of the pontoons 3 refer to FIG. 9.

The mounting brackets 16 of the pontoon mounting braces 5 & 6 are fastened to the pontoons 3 by two methods that reinforce each other while at the same time allowing for quick and easy assembly and disassembly of the present invention 4. The first fastening method is a screw 17 having the appropriate length that allows the screw to pass through the mounting bracket 16 and penetrate the pontoon body 3. This process is repeated for each of the individual mounting brackets 16 of the straight pontoon mounting brace 5 and of the U-brace's 6. After the braces 5 & 6 are fastened in place, the screw joints are reinforced by placing auxiliary straps 18, refer to FIGS. 9, 10 & 11, underneath the bottom of the pontoon 3 then wrapping the straps 18 around the exposed areas of the pontoon 3 and overtop the strapping support block 19, refer to FIG. 3B, of pontoon mounting braces 5 & 6. Once the strap 18 is in position, draw the strap 18 taut to firmly hold the pontoons 3 in position so not to allow movement of said pontoon 3, refer to FIG. 9. This process is then repeated for each pontoon-mounting bracket 16.

Figure 8:
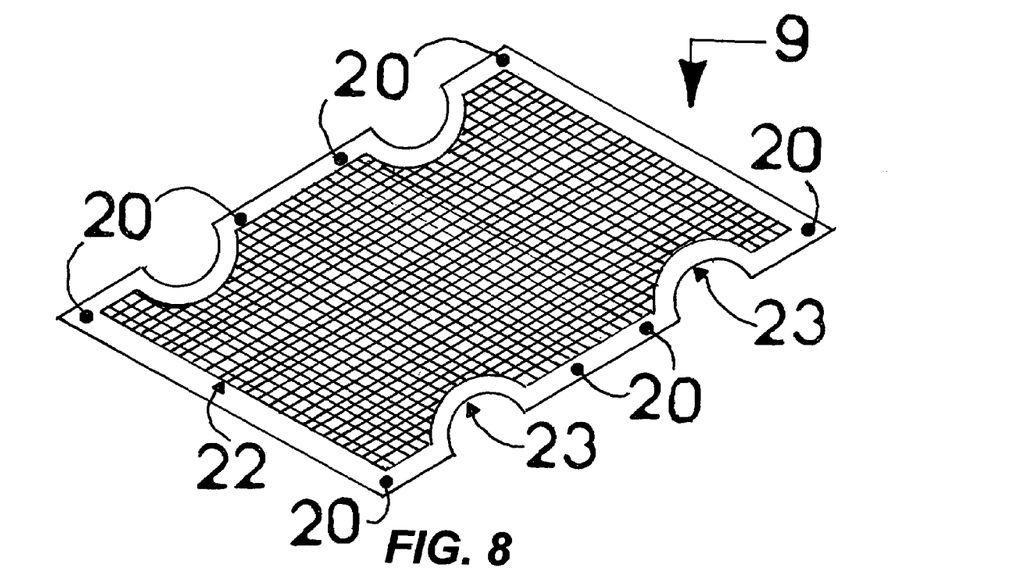
FIG. 8 is a perspective elevation view showing the landing net assembly.

Referring to FIG. 8, the netting 9 is comprised of a fish friendly netting material 22, brass button snaps 20, and a mildew and ultra-violet light resistant material edging 23.

The netting material 22 is cut to the appropriate needed dimensions by using this formula (add approximately eight-inches to the measured span between the top centers of pontoons 3 and add two-inches to the measured length of pontoons 3). The next cuts required by the netting material 22 are concave incisions where the netting 22 wraps around the pontoon mounting brackets 16 of said braces 5 & 6, refer to FIG. 8. The banding material 23 should be cut to a minimum width of two and half-inches in width. This permits a quarter-inch hemline plus a one-inch band 23 for covering the outer edges of the netting material 22.

When all the required cuts are made in the netting material 22, next fold the edges of the netting material 22 inwards towards the center one-inch. Next fold the banding material 23 evenly around the outer edges of the netting material 22 and sew in place.

To complete the landing net 9 install brass button snaps 20 on each side of the four concave cuts made in the netting material 22 and one snap button installed in the net's 9 centers of both length edges.

And now, referring to FIG. 12, install the landing net 9. First lift the tabletop/measuring board to its full open position. Lay the netting 9 into the Fish Handling System For Big Game Tube Fishing 4 placing one end of the net 9 underneath the straight-brace 5 and the opposite end of the net 9 over top the U-brace 6. Starting at one corner of the pontoon 3 attach the first snap button stud 21, refer to FIGS. 9, 10 & 11, at top center of said pontoon 3 and fasten the corner snap button 20 of the net 9 to the stud 21. Now begin stretching the net 9 along the length of said pontoon 3 and mount the next stud 21 where the next button snap 20 alignment requires. Repeat this process for the remaining section of the pontoon 3. Repeat the net installing process for the opposite pontoon 3 using the method described.

Referring to FIG. 9, the adjustable multi-purpose handle 10 comprises of a section of rope 24 of the appropriate needed thickness and length, eye bolts 25 of a proper size which allows the non-restricted movement of said rope 24, and a guy line tensioning stop 26.

Referring to FIG. 11, the guy line tensioning stop 26 may be constructed from a thin rectangular material of preference having the proper dimensions of length and width which in turn allows for oversized holes, in comparison with the diameter dimension of said rope 24, at each end of said guy line's tensioning stop 26. The oversized holes made in the guy line's tensioning stop 26 must be of a proper diameter allowing for a smooth transition of movement of the guy line's tensioning stop 26 from the carrying handle mode to the float tube attachment mode, whilst at the same time, having a dimension that will not allow a terminating knot to pass through.

Figure 10:
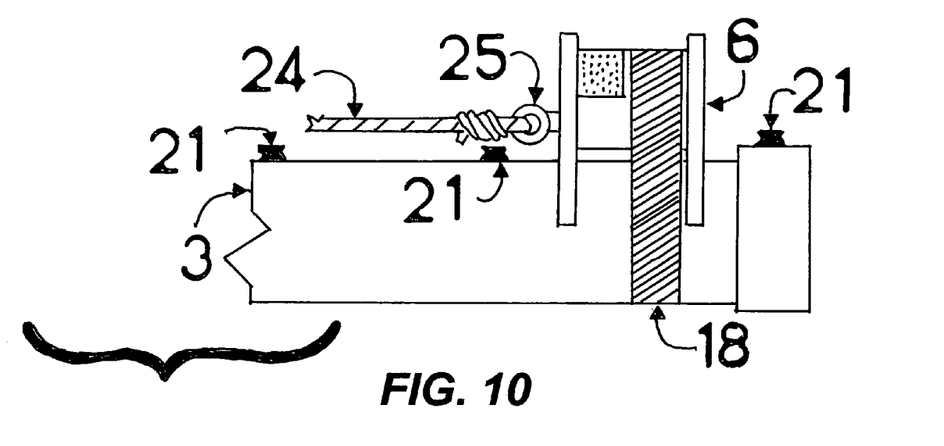
FIG. 10 is a sectional side view from the preferred embodiment of FIG. 9 of the Fish Handling System For Big Game Tube Fishing the adjustable multi-purpose handle's guy line's tied downed attachment to the U-brace's mounting brackets.

Referring to FIGS. 10 & 11, the eyebolts 25 are attached to the sides of the mounting brackets 16. The rope 24 is threaded through one hole in the guy line stop 26 and then terminated at an eyebolt by a knot or optional attaching method of preference. The rope 24 is threaded through the eye-bolt 25 opposite the terminated eyebolt 25 then passes through the remaining hole of the guy line stop 26 and terminated by a knot or other appropriate termination method.

Using the various preferred embodiments of the present invention, a tube fisherman fishing for big game fish now has at his disposal a proven pliable method for safely landing, controlling and measuring big game fish.

The new Fish Handling System For Big Game Tube Fisherman 4 of the present invention is an exceptional raised floating workstation. The tabletop/inch incremented measuring board 8 is well within reach from within the fishing tube. The flat usable table surface 8 provides a place for the temporary placement of fishing equipment.

The new Fish Handling System For Big Game Tube Fisherman 4 remains stable in calm as well as rough water conditions and works in all climate conditions using the separated pontoon system 3.

The use of the embodiment, the adjustable multi-purpose carrying handle 10 of the new Fish Handling System For Big Game Tube Fisherman 4 of the present invention is easy to use. Sliding the guy line stop 26 to the left loosens the rope 24 making it the mooring line for attachment to the fishing tubes D-rings by means of two quick release-fastening devices of preference. Sliding the guy line stop 26 to the right tightens the rope 24 and the guy line stop 26 locks the rope in place for carrying.

One of the first embodiments of the present invention the new Fish Handling System For Big Game Tube Fisherman 4, the landing net 9, is how quickly, easily, and with one hand operation a tube fisherman can lift the tabletop/measuring board to its full open position for direct access to the netting 9.

It is apparent from above that the present invention accomplishes all of the objectives set forth by solving a tube fisherman's two main problems encountered while performing the art of fishing from a float tube, the need for a stable floating attachable work station and a hands free fish landing device. The new Fish Handling System For Big Game Tube Fishing 4 solves the problems previously mentioned by combining all solutions into one individual enterprise.

The new Fish Handling System For Big Game Tube Fishing 4 actual minimum dimensions that will insure the proper functioning of the unit's design concept are a total length of thirty-three inches, total width of twenty-one inches, total height of seven and five-eights inches. These dimensions give the present invention 4 the ability to be easily stored when not in use, the convenience of easy transport in smaller vehicles, optimum stability in rough water conditions and/or when weight is applied to the unit.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications therefore may be made without departing from the principle concepts set forth herein. Hence, the proper scope of the present invention should be determined only by broadest interpretation of the appended claims so as to encompass all such modifications and equivalents.

We claim:

1. A fish handling system for big game tube fishing comprising:

a buoyant platform, said platform having a floating base unit comprising two cylindrical pontoons each having first and second ends, said pontoons being interconnected to each other by a straight-brace extending between the first ends and a U-brace extending between the second ends of said pontoons, said platform having brackets mounted atop said pontoons, said brackets being fixed in place atop said pontoons by individual pins, said brackets and pontoons also being secured to each other by auxiliary straps, said pontoons having button studs mounted thereto such that they are evenly spaced and centered atop said pontoons;

a tabletop/measuring board, said tabletop/measuring board being rectangular in shape and having first and second ends defining a length therebetween and first and second sides defining a width therebetween, said tabletop/measuring board having a table support attached to an underside of said tabletop/measuring board at each of said ends of the tabletop/measuring board, said tabletop/measuring board having inch increment lines marked across the width such that said inch increment lines are located along the entire length of a top surface of said tabletop/measuring board, said first end of said tabletop/measuring board having a zero-inch increment line thereat, said tabletop/measuring board having a lip board attached at the first end of the tabletop/measuring board, said tabletop/measuring board being hingedly attached to said straight brace by a first threaded bolt placed through said straight brace and one of said table supports and said first bolt being held in place using a lock washer and a hex head nut, said tabletop/measuring board being hingedly attached to said U-brace by a second threaded bolt placed through said U-brace and the other of said supports and said second bolt being held in place using another lock washer and another hex head nut;

a landing net, said landing net having a generally rectangular shape, said landing net having a border sewn to outer edges thereof, said border comprising a mildew and ultra-violet resistant material, said landing net having evenly spaced button snaps for attaching to the button studs, said landing net being placed between said pontoons such that said landing net lays overtop said U-brace but underneath said straight brace, said tabletop/measuring board capable of being lifted to gain access to said landing net;

an adjustable multi-purpose handle, said handle comprising a nylon rope, said rope threads through a first hole at one end of a guy line stop, said rope being attached to a threaded eye bolt, said eye bolt being screwed into one of said brackets of said platform such that said eye bolt is directly centered in said one of said brackets and over one of said pontoons, said rope being threaded through another threaded eye bolt, said another eye bolt being screwed into another of said brackets of said platform such that said another eye bolt is directly centered in the another of said brackets and over said one of said pontoons, said rope threads through a second hole at the other end of said guy line stop and then terminates thereat with a knot.

2. The fish handling system for big game tube fishing of claim 1 wherein when said adjustable multi-purpose handle is drawn taut it is capable of being used as a carrying handle.

3. The fish handling system for big game tube fishing of claim 1 wherein when said adjustable multi-purpose handle is loosened it is capable of being used as a mooring line for temporary attachment to a fisherman's float tube.

4. The fish handling system for big game tube fishing of claim 3 wherein said adjustable multi-purpose handle is capable of being temporarily attached to a fisherman's float tube by two quick release-fastening devices.

* * * * *